United States Patent [19]

Collins

[11] Patent Number: 4,481,117
[45] Date of Patent: Nov. 6, 1984

[54] SWIMMING POOL CLEANING METHOD AND APPARATUS

[76] Inventor: Christopher G. Collins, 13946 Dawson St., Garden Grove, Calif. 92643

[21] Appl. No.: 426,630

[22] Filed: Sep. 29, 1982

[51] Int. Cl.³ .............................................. B01D 35/00
[52] U.S. Cl. .................................... 210/776; 210/169; 210/238; 210/471; 15/1.7; 15/145; 43/11
[58] Field of Search .............. 210/315, 238, 471, 470, 210/169, 497.01, 495, 776, 749; 43/11; 403/187, 316, 361; 15/145, 1.7

[56] References Cited

U.S. PATENT DOCUMENTS

| 2,001,149 | 5/1935 | Monschein | 210/470 |
| 3,220,037 | 11/1965 | Ruhling | 210/471 |
| 4,013,563 | 3/1977 | Petrik | 210/470 |
| 4,169,331 | 10/1979 | Baker | 210/471 |
| 4,225,437 | 9/1980 | Woodward | 210/470 |

FOREIGN PATENT DOCUMENTS 1533695  11/1978  United Kingdom ..................... 43/11

Primary Examiner—Peter Hruskoci
Assistant Examiner—Sharon T. Cohen
Attorney, Agent, or Firm—William J. Kearns

[57] ABSTRACT

A swimming pool cleaning apparatus comprising a quick connect-disconnect handle, an ovate frame, a collecting net structure with an inner and outer section, and a blade-like edge on the forward portion of the frame. The collecting net structure contains an open inner net contained in a closed outer net; the inner net allows easy ingress of debris into the outer net while retarding its escape if the direction of net motion is reversed. The blade-like edge of moderately flexible material attached to the front of the net increases the efficiency of collection of debris close to the bottom walls of the pool. Construction of the apparatus is modular and allows easy replacement of worn parts without discarding serviceable parts; repairs can be made without the use of tools. The ease of assembly and disassembly allows the net to be stored and shipped in a disassembled state and is reflected in reduced handling costs.

5 Claims, 9 Drawing Figures

U.S. Patent Nov. 6, 1984 Sheet 2 of 2 4,481,117
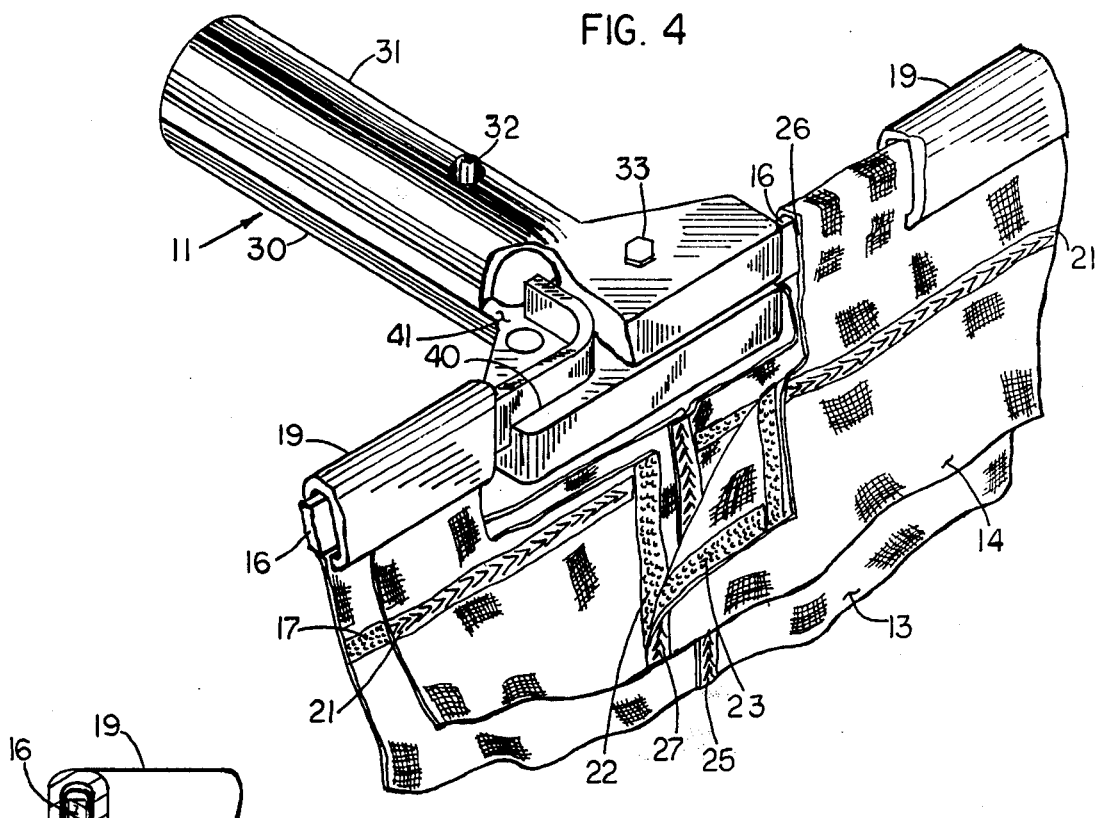
FIG. 4
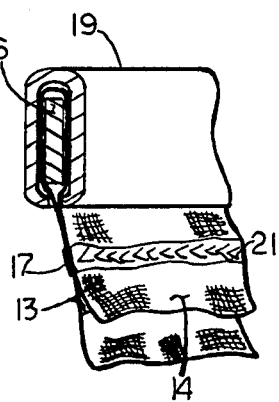
FIG. 5
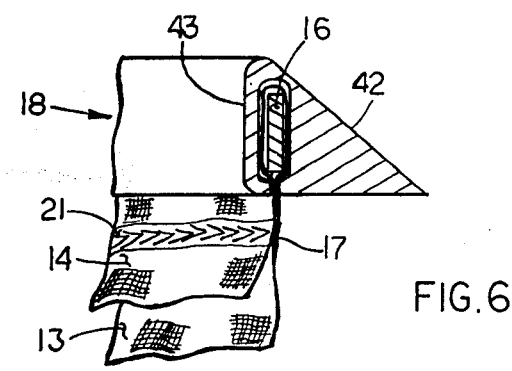
FIG. 6
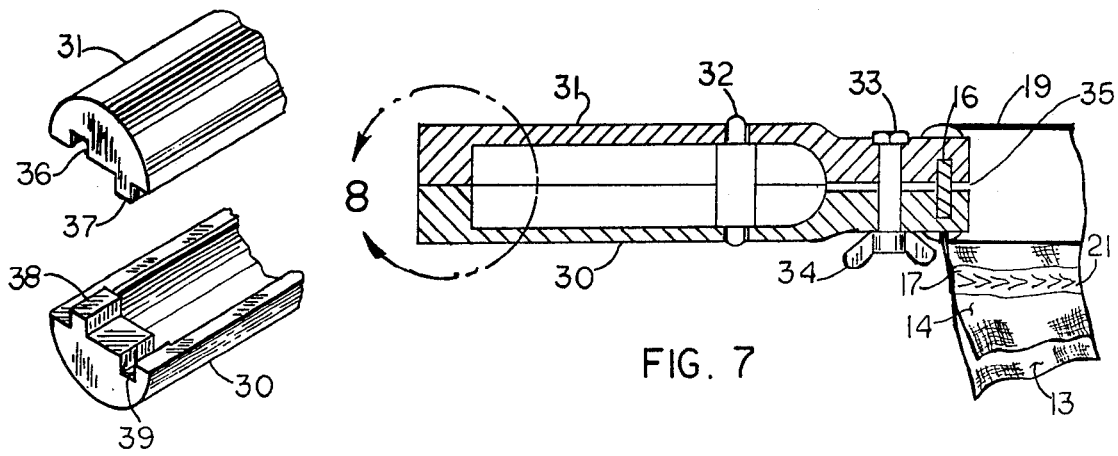
FIG. 8
FIG. 7

SWIMMING POOL CLEANING METHOD AND APPARATUS

TECHNICAL FIELD

This invention relates to devices for cleaning swimming pools, spas, decorative pools, and similar bodies of water, and in particular to "leaf rakes" for removing leaves and other debris from the submerged surfaces of pool structure, i.e. pool bottoms, step surfaces and sloping walls: it also relates to "skimmers" which are used for collecting floating debris.

BACKGROUND ART

Cleaning nets like "leaf rakes," herein defined as nets whose depth of collecting pouch is about equal to or about twice as great as the smallest dimension of the opening into the net, and "skimmers," which are similar but have a shallower net, have been in use for many years. Although they may vary somewhat in size and shape, leaf rakes and skimmers have common structural features. One feature is that netting material is usually attached to the frame by wrapping it around the frame and applying a conformal metal or plastic cover sheath which secures the net to the frame and protects it from abrasion during use. Since netting material has a relatively short life, due to mechanical wear and the action of sunlight and water chemicals, it requires frequent replacement. As existing nets are designed, netting replacement by the end user is usually difficult because the netting must be held in a precise relationship to the frame with one hand while the cover sheath is attached with the other. Often, special tools are required, or the entire net must be replaced or returned to the manufacturer for repair. This net replacement problem has been addressed specifically in U.S. Pat. No. 4,169,331 which describes a net which is relatively easy to replace. However, fastening the net to the frame by means of a very special plastic frame cover to which the net is secured by a molding process is inherently expensive. The net fastening method described in U.S. Pat. No. 3,220,037 is a simpler, less expensive solution but requires considerable skill and/or special tools to accomplish the task. Another feature is that the rigid, net-supporting frame is permanently assembled to the short handle that is used for quick connect-disconnect attachment of the net to a long extension pole. If the frame is accidently bent or otherwise damaged, for example, in many cases the entire assembly including the frame and its short attachment handle must be replaced. An attempt to alleviate the handle problem is presented in U.S. Pat. No. 2,706,664 wherein a simple method of assembling a frame with round cross-section is shown. However, it is not easily adaptable to frames of rectangular or girder shaped cross-section. The assembly method shown for a frame of rectangular cross-section in U.S. Pat. No. 3,220,037 not only requires special tooling for assembly but also results in a high stress point at the sharp corners where the frame enters the handle.

In addition to the problems of netting and parts replacement resulting from the design features of existing nets, there are operational difficulties arising from features omitted from their design. One deficiency of existing leaf rakes is that there is no provision to keep leaves and debris from coming back out of the net as it is pushed along, resulting in lost time for pool servicemen. U.S. Pat. No. 4,003,100 describes a net structure intended to retain collected debris during use. The form of this net with its rigid entry member and nominally vertical orientation of net opening does not lend itself well to most pool cleaning applications because the form of underwater pool surfaces requires some flexibility and curvature of the net entrance lip. Another common deficiency is that the edge of the net where it contacts the pool surfaces is generally round or blunt, thus making it difficult to coax leaves very close to the bottom of the pool into the net. An example of a special edge structure which has a lip designed to capture debris adhering to pool wall surfaces is given in U.S. Pat. No. 3,220,037. The difficulty with this device is that the net must be inverted in order for the lip to work effectively. Another design feature common to most existing nets is that they are manufactured as permanent assemblies which cannot easily be disassembled or assembled in the field. Therefore, they must be shipped and stored in larger, space consuming containers than would be required if they could be broken down into a more compact package.

DISCLOSURE OF INVENTION

The collection net apparatus of the present invention, as applied to both leaf rakes and skimmers, provides for easy replacement of netting as well as all other parts of the net, by using a modular design requiring no tools for assembly. For leaf rakes, the addition of a secondary inner net and a front cover blade to the basic net structure insures that leaves and debris are much more effectively gathered and retained in the net structure of this invention than in existing nets. The modular design and ease of assembly make it practical to store and ship nets in a disassembled condition, thereby reducing handling costs.

Accordingly, it is an object of this invention to improve the collecting efficiency of a swimming pool cleaning net by trapping collected debris until the net is deliberately emptied, and to provide a blade-like front edge on the net to enhance the ability of the person handling the net to pick up debris close to the bottom of the pool.

A further object of this invention is to provide an inexpensive net structure that is assembled from modular components common to both leaf rakes and skimmers in such a way that any part can be replaced with simple tools, or with no tools at all, without the necessity of discarding any other parts which are still useful.

A still further object of this invention is to provide a net structure that requires less storage space and a smaller shipping container than existing nets of comparable capacity.

BRIEF DESCRIPTION OF THE DRAWINGS

In the drawings:

FIG. 4 is a perspective view within the line 4 of FIG. 1 with cut-away sections showing the frame held in the detachable handle, the netting around the frame, the frame cover and the reclosable seam of the inner net;

FIG. 5 is a cross-section of the frame, the detachable net looped over the frame, and the rear portion of the protective cover taken along line 5—5 in FIG. 2;

FIG. 6 is a cross-section of the frame, detachable net and center portion of the cover blade taken along line 6—6 in FIG. 2;

FIG. 7 is a cross-section of the frame and detachable handle taken along line 7—7 of FIG. 2; and FIG. 8 is an exploded perspective end view of the detachable handle taken inside the line 8 of FIG. 7.

DESCRIPTION OF THE PREFERRED EMBODIMENT

Figure 1:
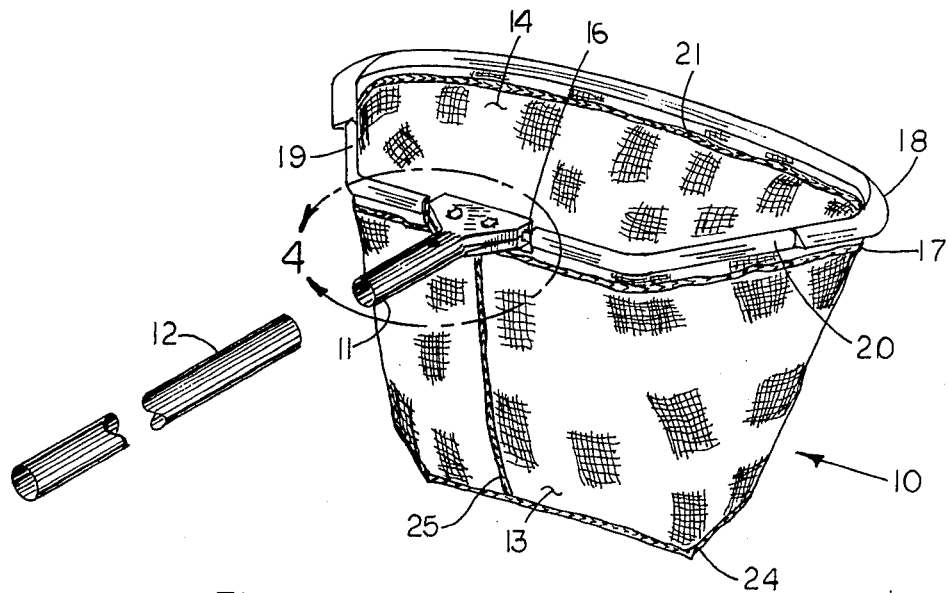
FIG. 1 is a perspective view of the pool net described herein.

Referring now to the drawings, the perspective view of FIG. 1 shows the improved net structure designated generally by 10; an extension pole 12 to which the net attaches during use is shown for reference. A collecting net consisting of a pouch-like section 13 depends perpendicularly from frame 16 and is protected from abrasion by cover pieces 18, 19 and 20. In the case of the leaf rake, an inner section 14, which functions as a debris trap, and a blade-like front edge 18, are added to increase the efficiency of underwater operations. All other structural features are common to both the leaf rake and the skimmer. Each component of the net structure will now be described in detail with emphasis on the leaf rake since it is slightly more complicated due to the addition of the inner net 14 and the cover blade 18.

With reference to FIGS. 1 through 4, the netting configuration for leaf rakes is shown to consist of a single piece of foraminous material such as fine nylon mesh. This single piece of netting material is formed into an outer section 13, made as a pouch with permanent seams 24 and 25, and is folded over frame 16 reentrantly into outer section 13 to form the inner section 14 which functions as a debris trap. The inner and outer sections are secured to frame 16 by means of reclosable fastener strips 17 attached to outer section 13, and 21 attached to inner section 14, so as to be closely parallel to frame 16 and become mating pieces when the netting is folded over frame 16. The inner section 14 is formed into an open-ended, reclosable cylinder by pressing together strips 22 and 23 to form seam 27. Inner section 14 is tapered so that the open end opposite frame 16 is smaller in perimeter than the outer section 13 and when properly in place is shorter than the outer section 13. In the preferred embodiment, said open end of the inner net 14 tapers to a perimeter about fifty percent of the perimeter of the other end; the depth of inner net 14 is about sixty to eighty percent of the depth of outer net 13. A rectangular cutout 26 in the netting material provides clearance for handle 11. Although the preferred embodiment utilizes reclosable seams to facilitate quick netting replacement, it should be readily apparent that the net structure consisting of outer section 13 and inner section 14 could as easily be made with permanent seams without departing from the spirit of this invention. In the case of skimmers, only outer net 13 is used and may have the same permanent seams 24 and 25 forming the pouch. No inner net 14 is required, so the netting material merely wraps around frame 16 as shown in FIG. 4, and is attached with reclosable fastener strips 17 and 21 with the inside netting material terminating at fastener strip 21. As with the leaf rake, the reclosable seam made of fastener strips 17 and 21 could be replaced with permanent seams. A special case of skimmer netting obtains for very shallow skimmer nets wherein netting material only slightly larger than frame 16 is bordered with a cloth loop around frame 16 formed by reclosable fastener strips like 17 and 21, or with permanent seams.

Figure 2:
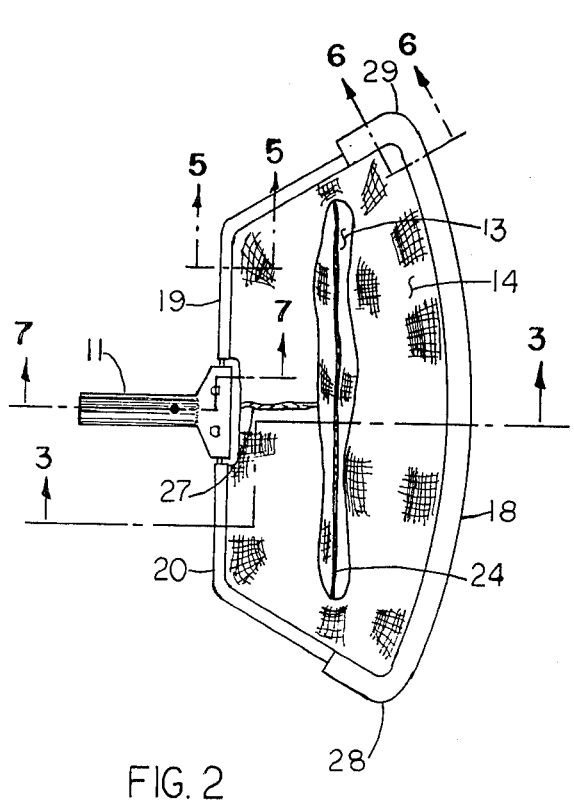
FIG. 2 is a top view of the pool net described herein.

The shape of frame 16, as shown in FIGS. 1 and 2, can be applied to both leaf rakes and skimmers. In the case of skimmers, length to width ratios, corner angles, and degree of curvature of side sections of the net are not critical and can be easily adjusted to various sized pools. In the case of leaf rakes, however, the shape of the frame is more critical. Therefore, the following discussion pertains primarily to frames for leaf rakes. In the preferred embodiment, frame 16 supporting the netting material is made from a single length of suitable material formed into the general ovate shape shown in FIG. 2, wherein the corners 28 and 29 are bent to an angle between 70 and 110 degrees. The forward portion opposite the support end and between said angles is of arcuate shape such that the ratio of the chord of the arc to its sagitta is between about ten and twenty to one. Operating experience with this net structure has shown that the width (transverse axis) of the frame 16 should be about two to three times its length for proper operation of the debris trap. In the preferred embodiment, the frame is made of aluminum of $\frac{1}{8}$ inch by $\frac{1}{2}$ inch cross-section, as shown in FIG. 5. Other materials such as plastic, steel, or stainless steel may also be used, and in various cross-sections from circular to girder shapes, i.e. curved, I-beam or C channel, depending upon the rigidity desired. FIG. 4 illustrates the configuration of the frame as it is clamped in grooves 40 in the quick connect-disconnect handle indicated generally as 11. wherein each end of frame 16 is bent at right angles. both to prevent lateral movement and to increase the vertical rigidity of frame 16.

Quick connect-disconnect handle 11 is shown in FIG. 4 to be made of two identical halves 30 and 31 and is made, for example, of die cast aluminum or injection molded plastic of suitable rigidity such as urethane. Only one mold configuration is needed to make both pieces 30 and 31, thus reducing production, stocking, and assembly costs considerably from what they would be with two different parts. The cylindrical portion of the handle, formed when 30 and 31 are assembled, is of the same diameter and length to match other interchangeable pool cleaning implements and contains a common spring-actuated locking device 32 for holding it in place in pole 12. Two bolts held non-rotatably by contoured recesses in 30 and 31 clamps said halves together tightly without the use of tools when wing nuts 34 are tightened. While bolts and wing nuts are used in the preferred embodiment, it is readily apparent to those skilled in the art that other easily actuated fastening devices, such as wire pins, self-locking rings, speed nuts, or spring clamps, may be used without departing from the spirit of this invention. The thicknesses of the flat, clamping areas 41 of handle parts 30 and 31 that hold frame 16 are reduced slightly at the inner surfaces so that a space 35 obtains to insure that the total clamping force of bolts 33 is transferred to frame 16. Since handle parts 30 and 31 completely enclose the right angle bends in frame 16, they act as strain reliefs to remove repeated bending stresses, occuring during use, from the already highly stressed bend area; operating experience with existing nuts has shown that most frames fail at these vulnerable points. The end of handle 11 opposite frame 16 is shown in an exploded perspective view in FIG. 8 taken inside line 8 of FIG. 7. Interlocking grooves 36 and 39 and projections 37 and 38 prevent lateral shifting of 31 with respect to 30. The shape and position of said grooves and projections, which in the preferred embodiment are rectangular in cross-section, are symmetrically located about the vertical centerline and are inverted about the horizontal centerline. Other locking geometries which preserve the ability to assemble two halves made from the same mold (such as a saw tooth or pin and hole) are all within the scope of this invention.

The netting material where it loops over frame 16 must be protected from abrasion during use. The most common method of doing this is to utilize an extruded plastic cover piece (similar to 19 in FIG. 5) which, in existing nets, both protects and clamps the netting to its frame. In this invention, since the netting is already secured to the frame 16 by seams, only abrasion protection is needed. This abrasion protection can be provided all around the net and frame periphery by such a cover 19 which, since it need hold only itself in place, may be more flexible and of lighter weight material than that used in existing nets. Skimmers require only such netting protection as cover 19 and, therefore, utilize only the simple form of protective coating shown in FIG. 5. However, in the case of leaf rakes, abrasion protection can be obtained while at the same time improving the debris gathering efficiency of the net by using a formed cover blade 18 with the blade-like, nominally triangular cross-section shown in FIG. 6 for the front part of the protective cover. The horizontal contour of this cover, matching as it does the arcuate contour of frame 16, allows the net 10 to follow pool bottoms easily since most submerged pool surfaces have gently curving contours. The sloping surface 42 of cover blade 18 directs debris efficiently into the net. It should be noted that, although the cross-section of cover blade 18 is a solid right triangle in the preferred embodiment, planar surface 42 may vary from moderately concave to moderately convex. The base 43 of the nominally triangular cross-section of cover blade 18 in the preferred embodiment is perpendicular to the plane of frame 16 and the altitude of said cross-section is parallel to the plane of frame 16. However, it is readily apparent to those skilled in the art that other cross-sectional configurations which may include material deletions for reducing weight and which adequately clamp the cover blade to the frame while still providing for a functional, sharp-edged ramp forward of frame 16 are also within the scope of this invention. Extending this triangular cross-section around corners 28 and 29 of frame 16 allows the net to reach corners such as those found at steps and underwater seats. Cover blade 18 may be made of the same material as covers 19 and 20 but should be flexibly deformable at the outer, pointed edge of the blade so as to conform easily to irregularities in pool surfaces and yet be elastic enough to return to its original shape; in addition, it must be quite resistant to abrasion. Low durometer urethane is ideally suited to this application, but other materials of appropriate physical properties may be used. The remaining two portions of frame 16 not enclosed by cover blade 18 can be protected by the same lightweight, extruded cover pieces 19 and 20 having the cross-section used for protecting skimmer nets as shown in FIG. 5.

Figure 3A:
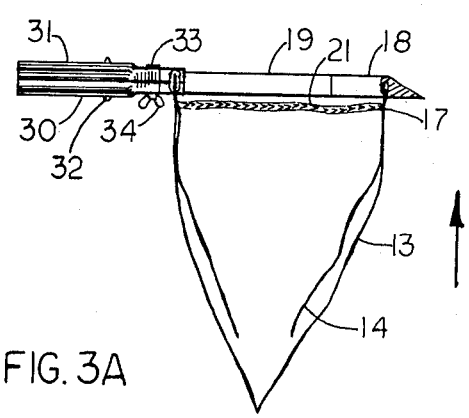
FIG. 3A is a cross-section of the net taken along line 3—3 in FIG. 2 showing the inner net for trapping debris in the open position.
Figure 3B:
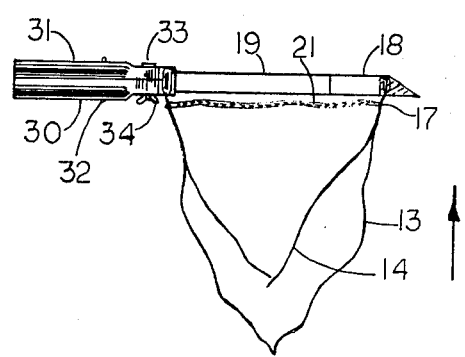
FIG. 3B is the same cross-section as in FIG. 3A but with the inner net in the closed position with arrows showing the direction of motion of the net, and omitting background detail for clarity.

Having thus discussed the various components of leaf rakes and skimmers in this invention, their overall operation will now be described. Skimmers, as described in this invention, are improved by virtue of their modular construction as are the leaf rakes, but otherwise function like existing skimmers as surface scoops. The leaf rakes described herein, however, have an operational advantage over existing leaf rakes because of the addition of cover blade 18 and debris trap 14 to the basic net structure. During the pool cleaning operation, net 10, attached to pole 12, is pushed along the bottom surfaces of pools with the front edge of cover blade 18 in contact with the bottom and the plane of frame 16 of the net inclined to the surface being cleaned at an angle varying from 20 to 70 degrees. Over this range of attitudes the combination of the flexibility of cover blade 18 and resiliency of the arcuate portion of frame 16 optimizes contact of cover blade 18 with pool surfaces and greatly increases the capture efficiency of the net for debris. At the end of the forward motion (in the direction of the pole), the net is usually lifted somewhat and is moved in the direction shown by the arrow in FIG. 3A, at which time captured litter goes to the bottom of the outer section 13 if it has not done so already. To start a second cleaning stroke, the motion of the net is often reversed, as shown in FIG. 3B. Now the water moving through the outer section 13 and inner section 14 tends to wash material out of the outer section 13, but since the direction of water flow reverses, the inner section 14 tends to close; previously gathered material in outer section 13 therefore will be prevented from escaping. The corners 28 and 29 of cover blade 18, being close to 90 degrees, facilitate removal of debris from the corners of steps and shelves in the pool.

In addition to the unique performance that can be realized with this improved leaf rake structure, there also are savings in time and money effected by the modular construction which applies to both the leaf rake and skimmer. Nets, being working tools, are subject to the usual wear and tear encountered in use, plus accidental breakage such as might occur when transporting nets from pool to pool in commercial operations. It is possible to replace the netting and any part or parts of these net structures, if necessary, without replacing remaining serviceable parts, and to do so without using any tools whatsoever. For example, the cover blade 18 and cover pieces 19 and 20 are replaced by prying the old pieces off by hand and snapping new ones into place. To replace the netting, it is only necessary to take off the cover pieces, as above, open the reclosable seams to remove the old netting, and replace the new netting material and cover pieces in the reverse order. Similarly, the frame may be disassembled and replaced by removing the covers and net as above and, in addition, loosening the two wing nuts to allow handle 11 to come apart to release the frame. Even in the case of nets made with permanent seams, net replacement requires only disassembly of the net as described above, including removing frame 16. Frame 16 is then threaded through the cloth loop formed by the permanent seam and then reassembled as before.

In addition to the improved operation of net 10, its ease of repair, and its savings in parts, the fact that the net can be disassembled so easily allows it to be stored and shipped in the disassembled state, thus bringing economies into the warehousing, shipping, and retailing of the net by requiring less storage space and smaller shipping containers than its fully assembled counterpart.

Having thus described two embodiments of this invention which form a family of nets by virtue of the commonality of parts used throughout each embodiment, it is to be understood that minor changes in shape, size, or materials which do not depart from the spirit of this invention will be apparent to those skilled in the art, given the teaching herein.

I claim:

1. A collecting net apparatus for swimming pools and the like comprising:

a planar, ovate frame symmetrical about the short or longitudinal axis of said ovate shape and having a transverse axis substantially longer than said short axis, a convex arcuate forward portion with chord parallel to said transverse axis, each end of said forward portion formed into an angle close to 90 degrees and proceeding rearward to complete the ovate shape and terminating in short ends projecting rearwardly, parallel to said short axis, said frame being moderately resilient along said short axis but substantially rigid normal to said plane;

a net formed from a single piece of foraminous material into an outer cylinder with one end closed to form a pouch, said outer cylinder passing outwardly of said frame and folded inwardly over said frame to form a reentrant, open-ended inner cylinder, said inner cylinder tapering so that the end of said inner cylinder opposite said frame is smaller in perimeter than said outer cylinder and said inner cylinder is shorter than said outer cylinder, said inner and outer cylinders being loosely secured to said frame by a seam adjacent to and parallel to said frame, both of said cylinders depending perpendicularly therefrom;

a protective cover of three portions easily attached over said frame and said folded net and conforming thereto having a center blade-like portion covering said arcuate forward portion of said frame and extending far enough beyond each end of said arcuate forward portion to cover said angles, and two separate rear portions with tubular cross-section covering rearward portions of said frame and said folded net; and a handle assembled from two mating, identical pieces, said handle firmly holding said short ends of said frame by the clamping action of easily actuated fasteners projecting through both said mating pieces, said fasteners held non-rotatably by contoured recesses in said mating pieces, and said mating pieces having interlocking projections and mating recesses on the end of said handle opposite said fasteners.

2. A collecting net apparatus as in claim 1 wherein the length of said chord of said convex forward portion is ten to twenty times the sagitta of said arcuate portion and said angle is between 70 and 110 degrees.

3. A collecting net apparatus as in claim 1 wherein said net is secured to said frame by reclosable fastener strips attached to said inner and outer cylinders adjacent to and parallel to said frame and additionally having a reclosable seam forming said inner cylinder.

4. A collecting net apparatus as in claim 1 wherein said center blade-like cover has a nominally triangular cross-section, said cross-section having an altitude substantially longer than the base of said triangle, said altitude lying parallel to the plane of said frame, and the vertex opposite said base forming the edge of said blade forward of said frame.

5. A method for increasing the collection efficiency of a collecting net apparatus used to collect debris from a pool surface comprising:

disposing an open-ended inner net within a closed outer net to form a composte net structure, said closed outer net passing outwardly of a planar, ovate frame, said frame being symmetrical about the short or longitudinal axis and having a transverse axis substantially longer than said short axis, said closed outer net folding inwardly over said frame to form a re-entrant, open-ended inner cylinder, said inner cylinder tapering so that the end of said inner cylinder opposite said frame is smaller in perimeter than said outer cylinder and said inner cylinder is shorter than said outer cylinder, said inner and outer cylinders being loosely secured to said frame by a seam adjacent to and parallel to said frame, both of said cylinders depending perpendicularly therefrom such that said inner net allows easy ingress of debris into said closed outer net upon forward motion of the composite net structure but retards egress of said debris from said closed outer net when the direction of motion of said composite net structure is reversed; and applying a flexible, cover-blade over the arcuate forward portion of said ovate frame and extending far enough beyond each end of said arcuate section to cover the angular ends of said frame, said cover-blade having a sharp but moderately flexible forward edge which is parallel to and in the same plane as said frame and which flexibly adjusts to the contour of the pool surface being cleaned so that, upon forward motion of said collecting net apparatus across said pool surface to collect said debris, debris adhering to said pool surface is scraped off, thus facilitating ingress of debris into said collecting net apparatus.

* * * * *